US008614868B2

(12) United States Patent
Lawler et al.

(10) Patent No.: US 8,614,868 B2
(45) Date of Patent: Dec. 24, 2013

(54) GRADED RESISTANCE SOLID STATE CURRENT CONTROL CIRCUIT

(75) Inventors: Robert Lawler, Philadelphia, PA (US); John P. Barber, Kettering, OH (US); John I. Ykema, Media, PA (US)

(73) Assignee: SPD Electrical Systems, Inc., Philadelphia, PA (US)

( * ) Notice: Subject to any disclaimer, the term of this patent is extended or adjusted under 35 U.S.C. 154(b) by 29 days.

(21) Appl. No.: 13/490,585

(22) Filed: Jun. 7, 2012

(65) Prior Publication Data

US 2012/0243137 A1 Sep. 27, 2012

Related U.S. Application Data

(63) Continuation-in-part of application No. 12/652,383, filed on Jan. 5, 2010, now Pat. No. 8,223,469, which is a continuation-in-part of application No. 11/959,055, filed on Dec. 18, 2007, now Pat. No. 7,667,938.

(51) Int. Cl.
*H02H 3/00* (2006.01)

(52) U.S. Cl.
USPC .................................................. 361/42; 361/8

(58) Field of Classification Search
USPC ........................................................ 361/8, 42
See application file for complete search history.

(56) References Cited

U.S. PATENT DOCUMENTS

| | | | | |
|---|---|---|---|---|
| 4,025,820 | A | 5/1977 | Penrod | |
| 5,559,656 | A | 9/1996 | Chokhawala | |
| 5,650,906 | A | 7/1997 | Marquardt et al. | |
| 5,933,304 | A | 8/1999 | Irissou | |
| 5,970,964 | A | 10/1999 | Furuhata et al. | |
| 6,075,684 | A * | 6/2000 | Duba et al. | 361/4 |
| 6,097,582 | A | 8/2000 | John et al. | |
| 6,336,448 | B1 | 1/2002 | Furuhata et al. | |
| 6,407,413 | B1 | 6/2002 | Kawamoto | |
| 7,315,439 | B2 | 1/2008 | Muenzer et al. | |
| 2008/0143462 | A1 | 6/2008 | Belisle et al. | |
| 2009/0154047 | A1 | 6/2009 | Ykema et al. | |
| 2009/0289691 | A1 | 11/2009 | Fuller et al. | |
| 2010/0254046 | A1 * | 10/2010 | Liu et al. | 361/8 |

* cited by examiner

*Primary Examiner* — Danny Nguyen
(74) *Attorney, Agent, or Firm* — Fox Rothschild LLP; Dennis M. Carleton, Esq.

(57) ABSTRACT

A circuit fault detector and interrupter which consists of parallel current conduction paths, including a path through a mechanical contactor and a path through a power electronics switch having active feedback control. A fault can be detected by a fault detection circuit within 50 μS of the occurrence of the fault, causing the mechanical contactor to be opened and the fault current to be commutated via a laminated, low-inductance bus through the power electronics switch. The power electronics switch is thereafter turned off as soon as possible, interrupting the fault current and absorbing the inductive energy in the circuit. The fault current can be interrupted within 200 microseconds of the occurrence of the fault, and the device reduces or eliminates arcing when the mechanical contactor is opened.

21 Claims, 17 Drawing Sheets

20 kA rms Available Fault

Legacy 28 kA let thru 35 ms interruption

PNSC 0.3 kA let thru 40 micro sec interruption

GRADED RESISTANCE SOLID STATE CURRENT CONTROL CIRCUIT

RELATED APPLICATION

This application is a continuation-in-part of and claims priority to U.S. application Ser. No. 12/652,383, filed Jan. 5, 2010 and entitled "Power Node Switching Center With Active Feedback Control of Power Switches", which is a continuation-in-part of U.S. application Ser. No. 11/959,055, filed Dec. 18, 2007 entitled "Power Node Switching Center," now U.S. Pat. No. 7,667,938.

BACKGROUND OF THE INVENTION

An electrical power delivery system is a complex system consisting of one or more generators with power flowing through cables to nodes, and then to loads. The functions required of the high-powered nodes are distribution, switching and power management. The functions of conversion and power conditioning are most appropriately handled at the branch level nodes. The node level functions are performed at high-power nodes in prior art legacy systems by circuit breakers and switch gear.

In the event of a fault, a prior art system may permit a high fault current, which has a potential for catastrophic collateral damage and which may also deprive other loads on the same or upwardly connected nodes of energy. When a fault occurs in the prior art system, a circuit breaker upstream from the fault opens. The prior art electromechanical circuit breaker may take up to 50 milliseconds to open for a high fault and 100 or more milliseconds for an intermediate fault. During these transient time periods, the systems upstream of the fault are perturbed. This perturbation is usually exhibited by a significant drop in voltage, particularly in close proximity to the fault, which may result in the voltage dropping to near zero for the period of time between the occurrence of the fault and the opening of the circuit breaker. This means that all loads being supplied by other circuits emanating from a node with a fault will experience a very low or zero voltage condition during the time of the fault. Sensitive loads may malfunction and some loads may become disconnected or may need to be reset or rebooted, causing them to be offline for a period of time significantly longer than the actual fault. This is obviously undesirable for sensitive and critical loads. Other loads may be transferred to alternate sources, which may cause further disturbances to the electrical system. In addition, there may be substantial arcing at the point of fault while the electromechanical circuit breaker is opening.

Such a scenario is shown in FIG. 1. In this example, there are 4 power panels (PP), each with six loads, fed from a load center node (LC). If a fault occurs at F1, with legacy equipment, the 18 loads in power panels #1, #2, and #3 will be deprived of power until the fault is cleared, which may take a minimum of 50 milliseconds and which could take as long as 400 milliseconds. The 6 loads in power panel #4 will be lost because the cable feeding them is faulted.

The parent to this application proposed a replacement for the electromechanical circuit breakers that currently detect and switch off faulted circuits which consisted of a device having two parallel current paths for each line (or phase). One path consisted of power electronic devices which could be gated to switch current on and off very quickly and the second, parallel path consisted of a mechanical contactor device which carries current very efficiently and which can open sufficiently quickly to commutate the current to the power electronic path in less than 25 microseconds. When a fault is detected, the mechanical contactor is tripped and the fault current is commuted to the power electronics path until the power electronics can be switched off. Using this configuration, it was possible to detect a high fault current within about 50 microseconds and to interrupt a high fault current in less than 400 microseconds. This innovation provided an approximate thousand-fold increase in speed over prior art legacy systems. In addition, it also was able to minimize or eliminate the arcing that traditionally occurs when an electromechanical circuit breaker is opened.

Once the fault current has been detected and commuted to the power electronics path, the flow of current from the source to the load can be interrupted by opening, or switching off, the power electronics path. The switch in the power electronics path typically consists of an IGBT which can be gated to interrupt the current flow.

One problem with this configuration is that the inductive energy stored in the source and load inductances must be dissipated in the interrupting switch in order to bring the circuit current to zero. The voltage that can be developed during interruption is the sum of the open circuit voltage of the source and the back EMF developed by the source and load inductances. As the interruption time decreases, dI/dt increases and the inductive voltage increases. As interruption time increases, the inductive voltage decreases, but the switch is forced to carry current while dropping the source voltage and so dissipates more energy. The switch can be destroyed either by excessive voltage or excessive dissipation (heating). There is an optimum opening time which limits voltage to a safe value, while dissipating the minimum energy.

In the current art, the switch is protected by employing a parallel snubber circuit. The role of the snubber circuit is to limit the voltage across the switch and absorb the energy from the circuit. Therefore, the switch can be opened as quickly as possible, while commutating current to the snubber circuit. The switch thereby dissipates minimum energy while the snubber circuit limits the voltage and absorbs the energy. The snubber circuit can be constructed with passive or active components or a combination of both.

One of the most common snubber circuits is the resistor-capacitor-diode (RCD) configuration in which a series resistor-capacitor with a diode across the resistor is attached in parallel with the switch. When the switch is opened, current flows through the diode into the capacitor, providing a low impedance path for the commutated current. The capacitor is sized such that the peak voltage, which is reached when the circuit energy has all been absorbed in the capacitor, is below the maximum allowable for the switch. When the switch is closed the diode then blocks voltage and forces the capacitor to discharge through the resistor. The resistor thus ends up dissipating the circuit energy. There are many variations on this approach which can include inductors, capacitors, resistors and diodes. One problem with this configuration, however, is that, in high power circuits, the size, weight and cost of these components is significant and therefore poses an important impediment to market acceptance.

An alternative approach to voltage and energy management is to use active components such as varistors with or without a series switch as the parallel snubber. A varistor is a nonlinear resistive element that displays high resistance at low voltage and low resistance above some threshold voltage. By selecting a varistor that has a threshold voltage above the circuit voltage, but below the safe limit of the switch, the voltage can be limited during rapid switch turn off, while the varistor is forced to absorb the circuit energy. Varistors do not have a sharp threshold voltage cutoff so adequate control of voltage sometimes requires selection of a low threshold voltage device which then leaks current and dissipates power during normal voltage operation. A series switch is then used to isolate the varistor during normal operation, and then connect it during interruption. Varistors are generally smaller than passive snubbers, but repeated operation deteriorates performance and the limited, and somewhat unpredictable, life of the device is a major impediment to broad application. The addition of a series switch improves life and reliability but with the penalty of another active component together with all the controls and auxiliaries necessary to operate it.

Therefore, it would be desirable to provide a circuit configuration which provides the same features as the snubber circuits of the prior art, but without the disadvantages and drawbacks associated therewith.

SUMMARY OF THE INVENTION

The power node switching center (PNSC) of the present invention replaces existing upstream circuit breakers with ultra-fast circuit interrupters capable of detecting faults within 50 microseconds and interrupting faults within 400 microseconds.

The criteria regarding the time to interrupt the current are dependent upon two conditions. First, that the interruption time is so short that the loss of voltage during the fault will not jeopardize the operation of loads on adjacent circuits and, second, that the magnitude of the fault current will not jeopardize the integrity of the power electronics. This enhances the survivability of loads being fed by adjacent circuits and effectuates a tremendous reduction in collateral damage caused by a fault.

The electromechanical switch consists of a very low resistance contact structure that can open in less then 25 microseconds which consists of coaxial stationary poles, each having multiple contacts, and a lightweight conductive disk that makes electrical contact between the poles of the switch. Upon fault detection, a rapidly acting magnetic system launches the disk away from the poles, thereby opening the circuit. This magnetic system consists essentially of a capacitor, a fast switch and a magnetic pancake coil. The disk has low mass to allow a high acceleration and rapid contact separation.

A low inductance, laminated bus structure between the contactor and the solid state power electronics enables non-arcing commutation of the current from the contactor to the solid state power electronics within 25 microseconds.

This concept eliminates the losses that would be experienced with prior art, electromechanical circuit breakers. The system therefore has an efficiency equal to or better than the electro-mechanical circuit breaker.

One innovative aspect of the invention is the fault detection circuitry, which is able to detect fault conditions within about 30 microseconds. This is accomplished with a narrow bandwidth, high gain integrator operating on the output of a Rogowski coil current detector.

Another innovative aspect of the invention is in the opening mechanism of the mechanical contactor, which relies on a traditional Thompson drive, combined with very low inductance achieved via the integration of the low mass mechanical contactor and the power electronics switch. The low mass allows the movement of the mechanical contactor at a very high speed and commutation of the current to the power electronics. The current is thus interrupted before it reaches high values, which eliminates the magnetic stress on upstream circuits between the generator and the point of fault. In addition, the voltage on the upstream node is lost for such a short period of time that all loads being fed from the node having the fault or upstream of the node having the fault survive the event and continue to operate normally, and may not even be aware of the occurrence of the fault event.

Yet another innovative aspect of the invention is the energy absorbing feature of the power electronics path, which allows the controlled absorption of the energy stored in the source and load inductances. In this aspect of the invention, the power electronics are turned on under active feedback control to limit the voltage developed during turn off, allowing the power electronics to absorb the energy of the source and load inductances, thereby eliminating the need for a snubber circuit to protect the power electronics.

FIG. 2 shows a comparison between the fault detection and interruption of legacy systems and the power node switching center. As can be seen, for an 85 kA rms fault current, a legacy system will take between 1 and 2 full cycles (30 milliseconds) to detect and interrupt the current. During this time, the fault current could reach 40-50 times the rated load current. The power node switching center can interrupt the current in about 200 microseconds, thereby limiting the current to the load to approximately 2 times the rated load current.

The power node switching center is a device which will distribute, switch and control power at electrical power nodes whose power handling capacity ranges from 0.5 MW to 50 MW, while accurately detecting downstream system faults and stopping the current flow in less then 400 microseconds.

DETAILED DESCRIPTION OF THE INVENTION

The operation of the switching module of the power node switching center PNSC consists of three main functions. These are: (1) detection of a fault current; (2) commutation of the current from a path traversing a mechanical contactor to a path through a power electronics switch; and (3) interruption of the fault current by opening the power electronics switch.

Figure 1:
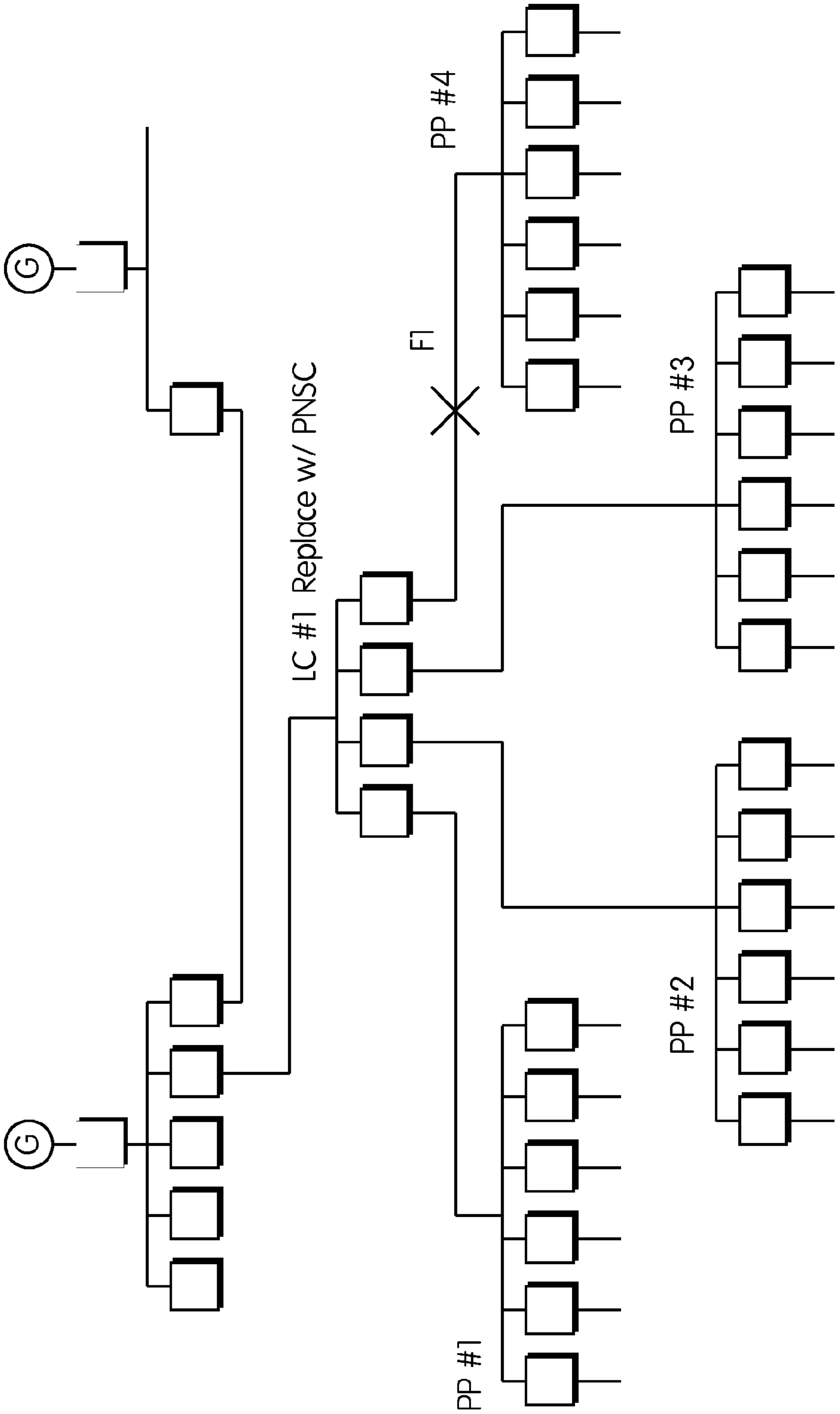
FIG. 1 is a schematic representation of an electrical power system, showing a fault at F1.
Figure 2:
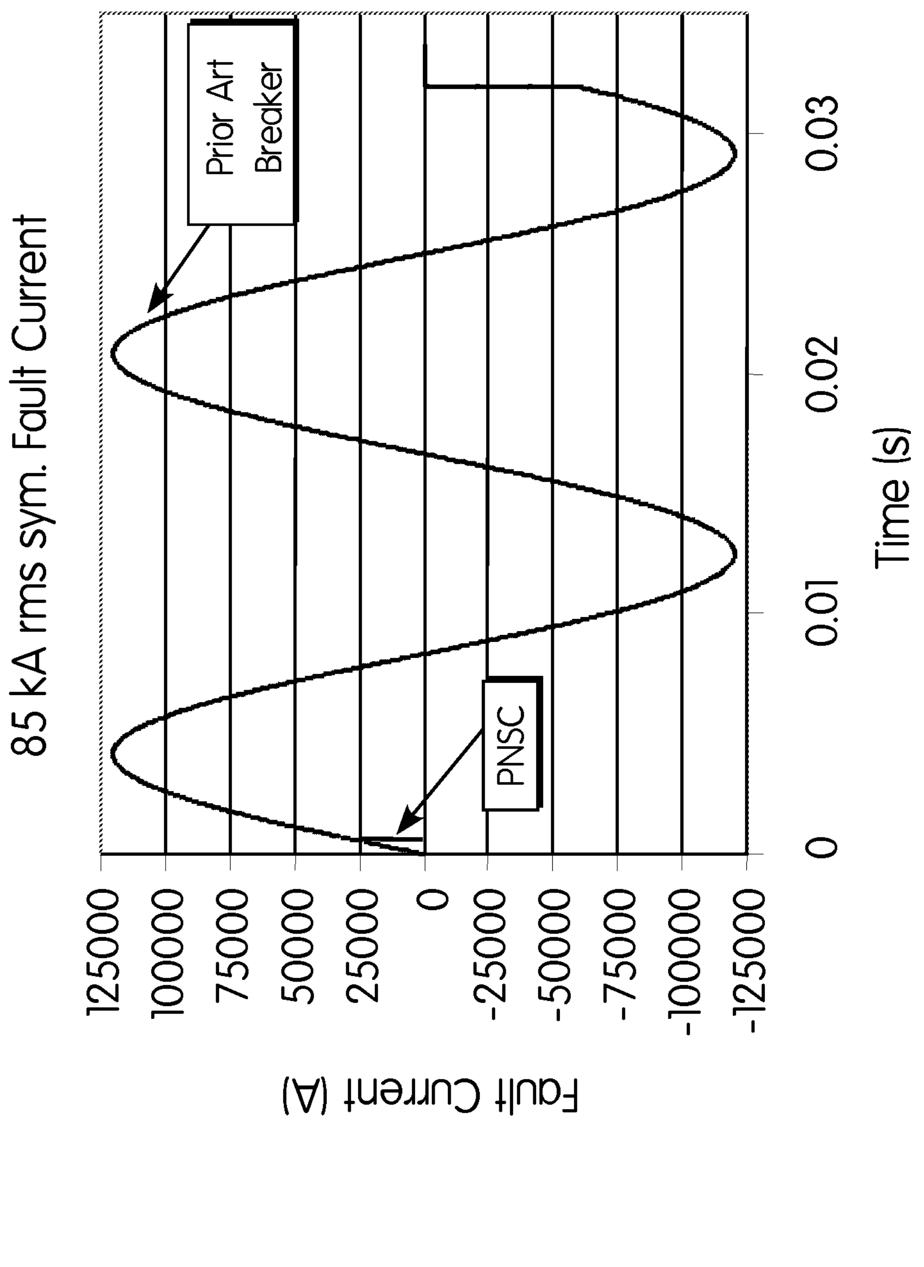
FIG. 2 is a graph showing the response time to fault current interruption with legacy electro-mechanical circuit breaker and the Power Node Switching Center of the present invention.
Figure 3:
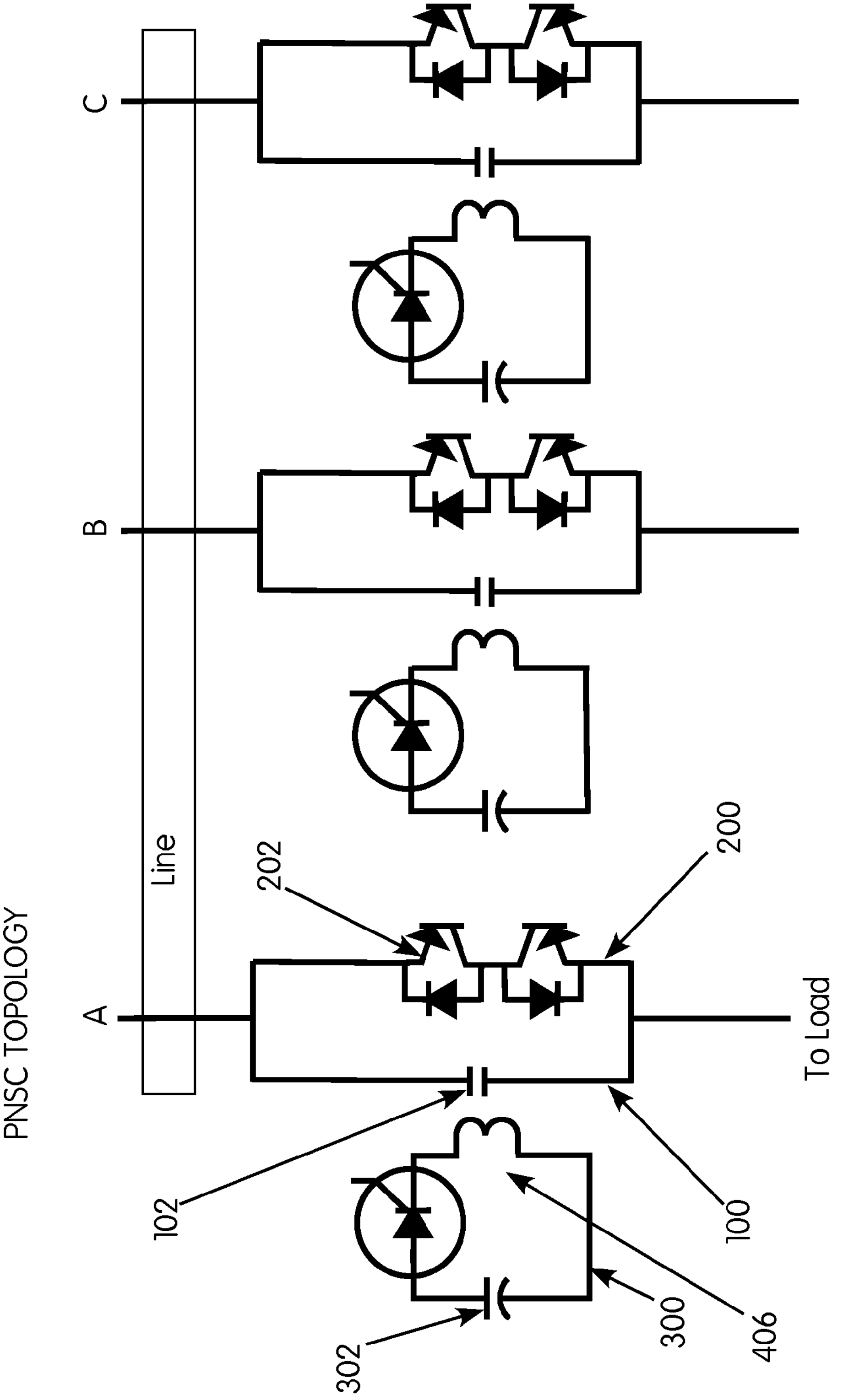
FIG. 3 is a schematic representation of the topology of the switching module of the power node switching center of the present invention.

The basic topology of the PNSC switching module is shown in FIG. 3. FIG. 3 shows the switching module in three phase configuration, in which separate circuits for all three phases would be housed in a single enclosure. This is not meant to be a limitation of the invention, however, as any number of phases could be housed together and still be within the spirit of the invention.

The preferred embodiment of the PNSC switching module consists essentially of two parallel current carrying paths 100 and 200 for each phase. Path 100 includes mechanical contactor 102, and is the primary current carrying path during normal (non-fault) operations. When a fault is detected, discharge circuit 300 is gated, causing mechanical contactor 102 to open by dumping the charge stored in capacitor 302 through pancake coil 406, thereby inducing a repulsive magnetic force between pancake coil 406 and disk 408 (See FIG. 9). As mechanical contactor 102 opens, current is commutated from mechanical path 100 to electronic path 200, and is then conducted via power electronics 202, which may consist of a pair of IGBTs or other power electronic devices. Power electronics 202, in the preferred embodiment, are continuously gated, even during non-fault operation, but in alternate embodiments may be turned off and gated only when a fault is detected.

The connection between mechanical path 100 and power electronic path 200 consists primarily of a laminated bus, which provides a low-inductance connection between paths 100 and 200. This allows for fast commutation of the current from path 100 to path 200. Because of the speed of the commutation, the voltage between the line end and the load end of path 100 does not have time to rise to a level which would result in the ionization of the air in the gap between disk 407 and contacts 402 and 404. This will reduce or eliminate arcing when mechanical contactor 102 is opened.

One novel aspect of the invention is the ability to detect a fault current within a few microseconds of the onset of the fault condition. During a fault condition, the current will rise rapidly. To detect a fault, the detection circuitry looks for an approximate 100 A change in current within a few microseconds. The detector, however, must not confuse a fault current with the normal operating current, which may consist of thousands of amps, normally at 60 Hz. Therefore, the detector must have a narrow bandwidth to detect the fault current, which typically has a high frequency content. The bandwidth for the detector will therefore typically be in the kHz-100 kHz range, allowing the detection of the rise in current within a time range of 1-100 microseconds (1/F), depending upon the magnitude of the fault current.

Figure 4:
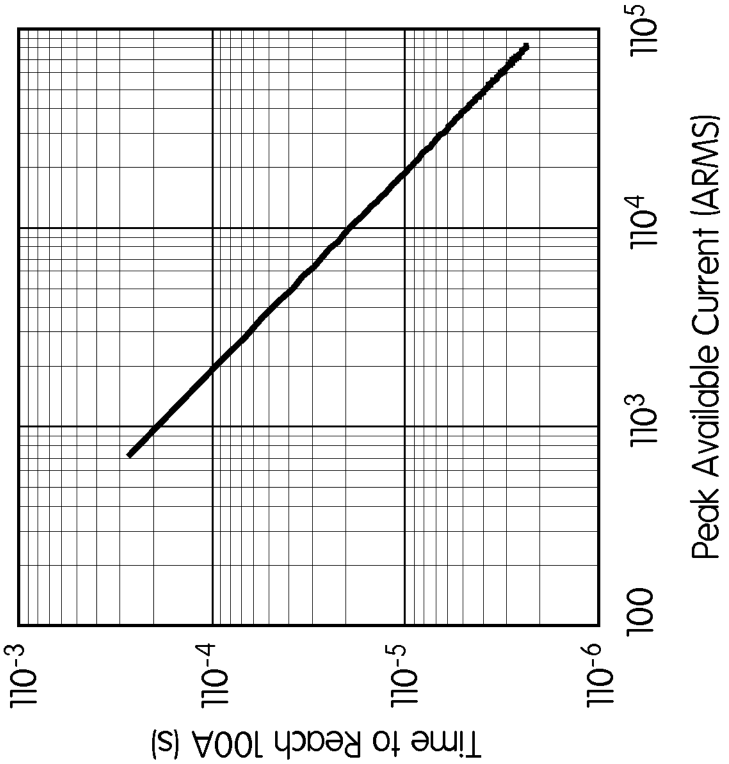
FIG. 4 is a graph showing time to detect a ~100 A change in current versus the peak available current. This graph shows that the higher the peak available current, the less time it will take to detect a ~100 A change.

FIG. 4 shows a graph of the time it takes to detect a 100 A change in current as a function of the peak available fault current. It can be seen that the higher the peak available currents, the shorter the time that is required to detect the change in the current necessary to declare a fault condition.

Figure 5:
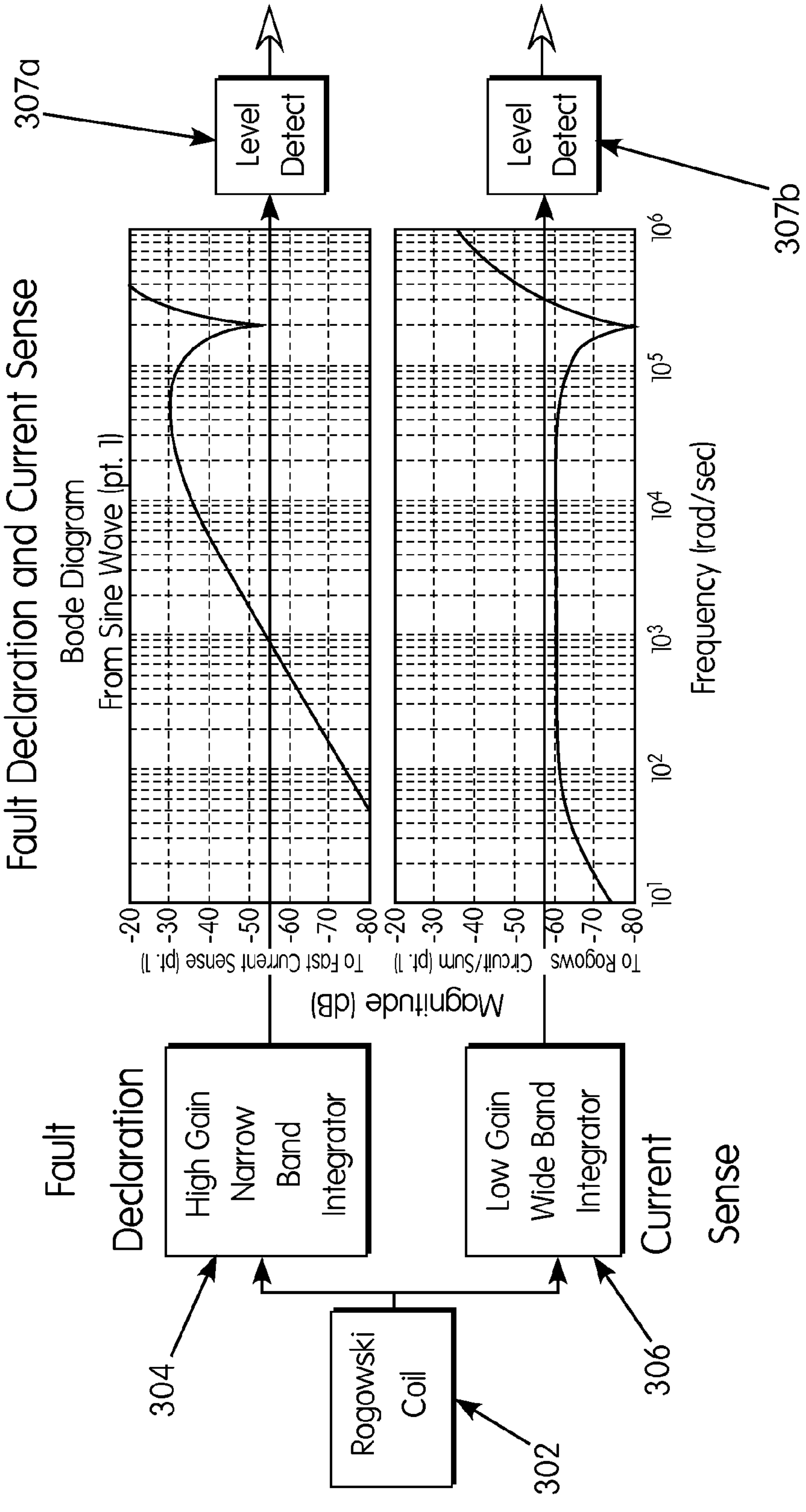
FIG. 5 is a block diagram of the fault detection portion of the invention, showing the frequency response of the integrators.

The current detector of the present invention is shown diagrammatically in FIG. 5. A Rogoswki coil 302 of a type well known in the art will produce a voltage which is proportional to the rate of change of the current flowing through a conductor (dI/dt). This signal is integrated for the purposes of fault detection using a high gain, narrow bandwidth integrator 304, with a passband in the range of 10 kHz-100 kHz. The response of the fault sensor is shown in the top half of FIG. 5. The sensor has a relatively flat response of about −30 dB (32 mV/A) between 20 kHz and 100 kz. At the line frequency of 60 Hz, the integrator is ineffective and the Rogowski output is passed through without being integrated. The gain is 30 dB below the high frequency integrated response, showing that the system is relatively insensitive to line frequency current. The output of the sensor is connected to a level detect circuit 307*a*. If the output voltage of the sensor exceeds the set level, a fault is considered to be present.

The output of the Rogowski coil is also integrated by a low gain, wide bandwidth integrator 306 for line frequency current sensing purposes. The response of this sensor is shown in the bottom half of FIG. 5. The response is flat from about 50 Hz to 100 kHz with a gain of about −60 dB (1 mV/A). This system senses line current over a wide bandwidth, down to line current frequency, but is over 30 times less sensitive than the fault current sensor at high frequencies. The output from this sensor is fed to level detect circuit 307*b*. When the sensor signal exceeds the set level an overload fault is considered to be present. Preferably, the level at which a fault is determined to have occurred will be adjustable.

Figure 6:
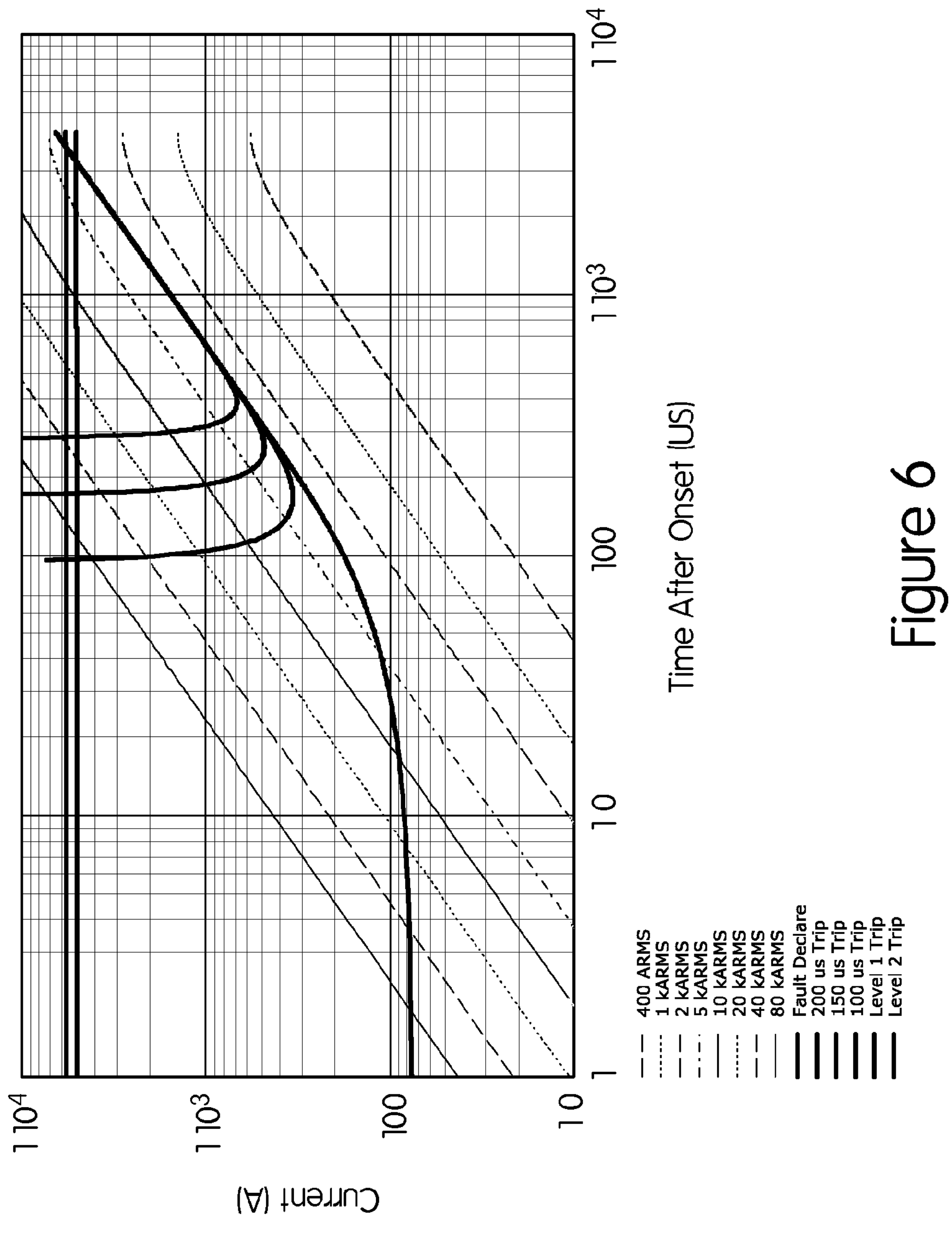
FIG. 6 is graph showing the response of the fault detection circuit for various magnitudes of fault current.
Figure 7:
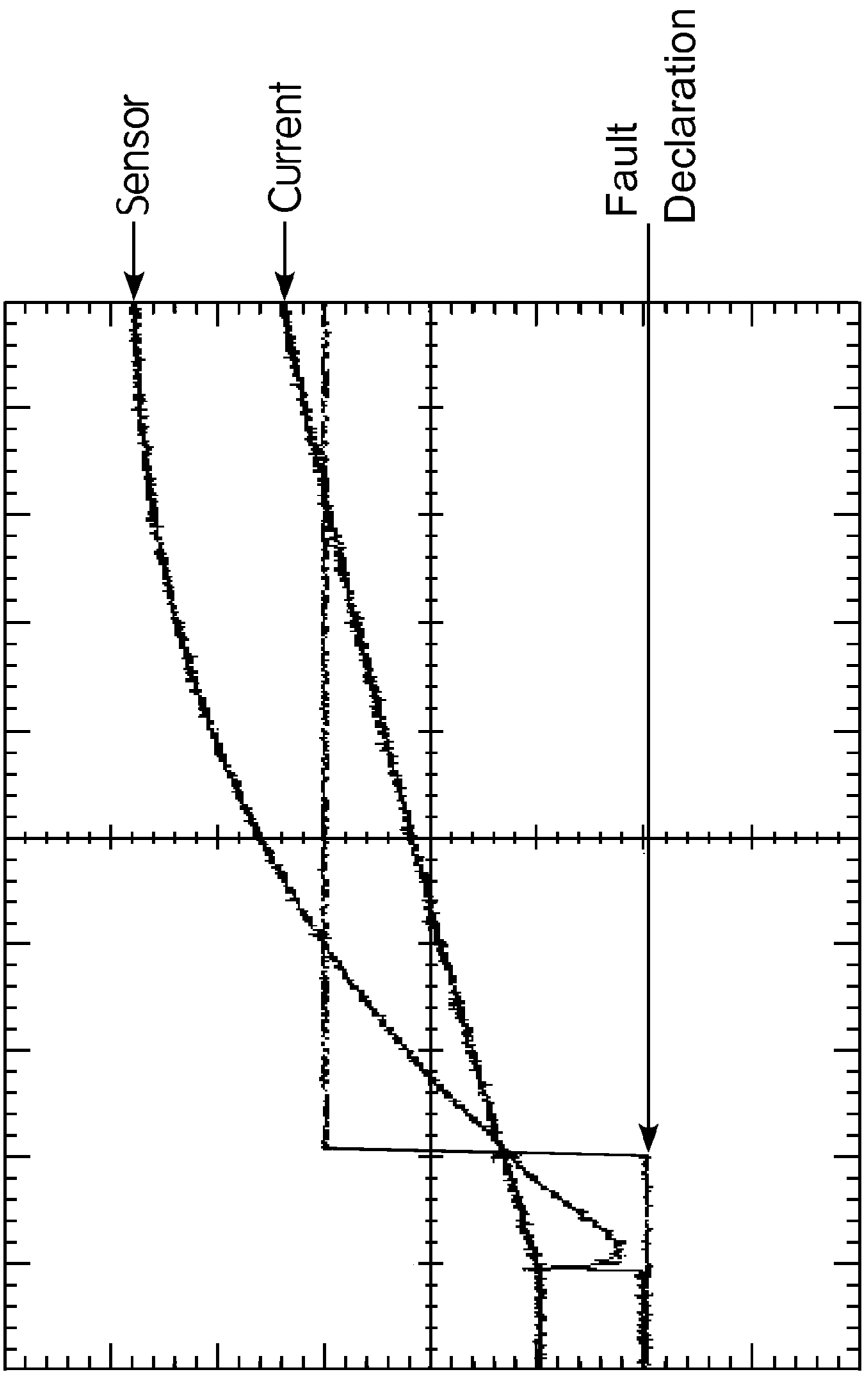
FIG. 7 is a graph showing the point of fault declaration as current rises.

FIG. 6 is a graph showing current versus time after the onset of a fault. The time required for the detection of the fault occurrence is shown where the straight line for the various current levels crosses the “Fault Declare” line. Note that this graph also shows that the time for a fault to be detected is a function of the magnitude of the current. This graph, for example, shows that an available fault current level of 80 kA is able to be detected in less than 2 microseconds, while a fault current of 5 kA is detected within 13 microseconds. FIG. 7 shows the declaration of a fault occurring when the current exceeds the sensor threshold level.

Prior to the detection of the fault, the primary path for current was path 100, through mechanical contactor 102. Once the fault has been detected, mechanical contactor 102 is opened and the current is then commutated to and conducted through path 200 until power electronics 102 can be shut down, thereby stopping the flow of all current.

Figure 8:
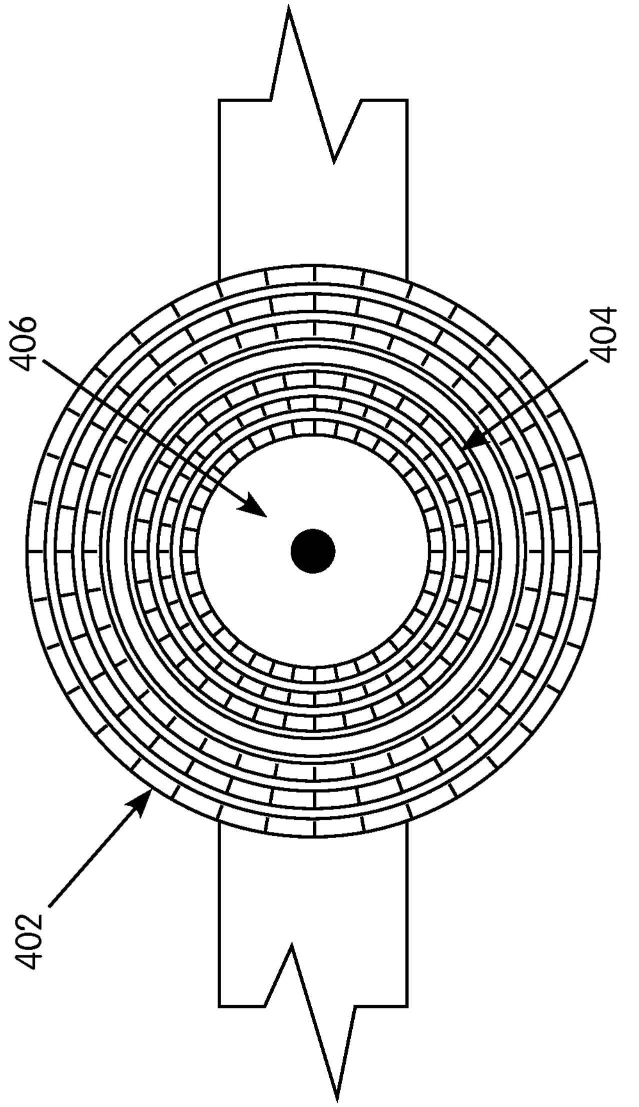
FIG. 8 is a photograph of the stationary contacts and pancake coil of the mechanical contactor of the present invention.

Mechanical contactor 102 is a novel improvement to prior art contactors based on a Thompson Drive. FIG. 8 shows the stationary contacts of mechanical contactor 102. The poles of the contactor are represented by concentric rings of finger-like protrusions labeled in FIG. 8 as outer stationary contacts 402 and inner stationary contacts 404, representing the two poles of the switch. Pancake coil 406 is disposed concentrically in the center of the outer and inner stationary contacts, 402 and 404 respectively, and is used for quickly moving the low mass disk 408 away from the contacts, thus opening current path 100.

Figure 9:
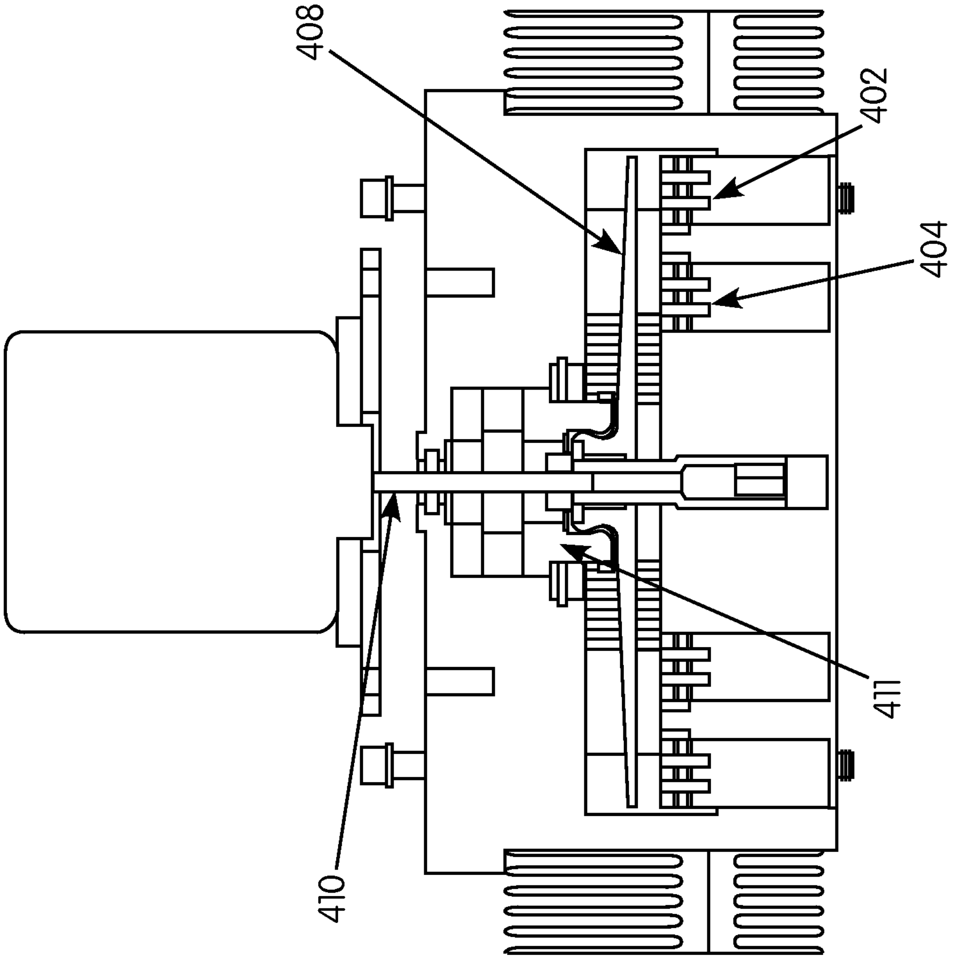
FIG. 9 is a cross sectional view of the mechanical contactor mechanism.

Contactor 102 is shown in cross-sectional view in FIG. 9. In normal operation, disk 408 is in contact with both sets of stationary contacts 402 and 404. Once a fault has been detected, pancake coil 406 is energized by dumping the charge stored in capacitor 302 into pancake coil 406, thereby driving disk 408 away from contacts 402 and 404, breaking the electrical connection between them. Disk 408 slides along rod 410 and is caught by a mechanical catch mechanism 411, which serves to hold disk 408 away from contacts 402 and 404. To engage the contact, mechanical catch mechanism 411 is released and disk 408 is driven into contact with contacts 402 and 404 via a solenoid acting on rod 410. Disk 408 is held in place during normal operation by a mechanical spring force, not shown in FIG. 9.

The novel aspects of the contactor mechanism 102 include the concentric configuration of stationary contacts 402 and 404 and pancake coil 406, and the low mass of moveable disk 408 which allows the disk to be driven away from contacts 402 and 404 in a very short period of time. Prior art mechanical contactors utilizing a Thompson drive typically have the contactor disk attached to a piston, such that the pancake coil must drive the mass of both the piston and the disk. In the contactor of the present invention, disk 408 slides along rod 410. As such pancake coil 406 is only required to drive the mass of disk 408 when it is energized.

Figure 10:
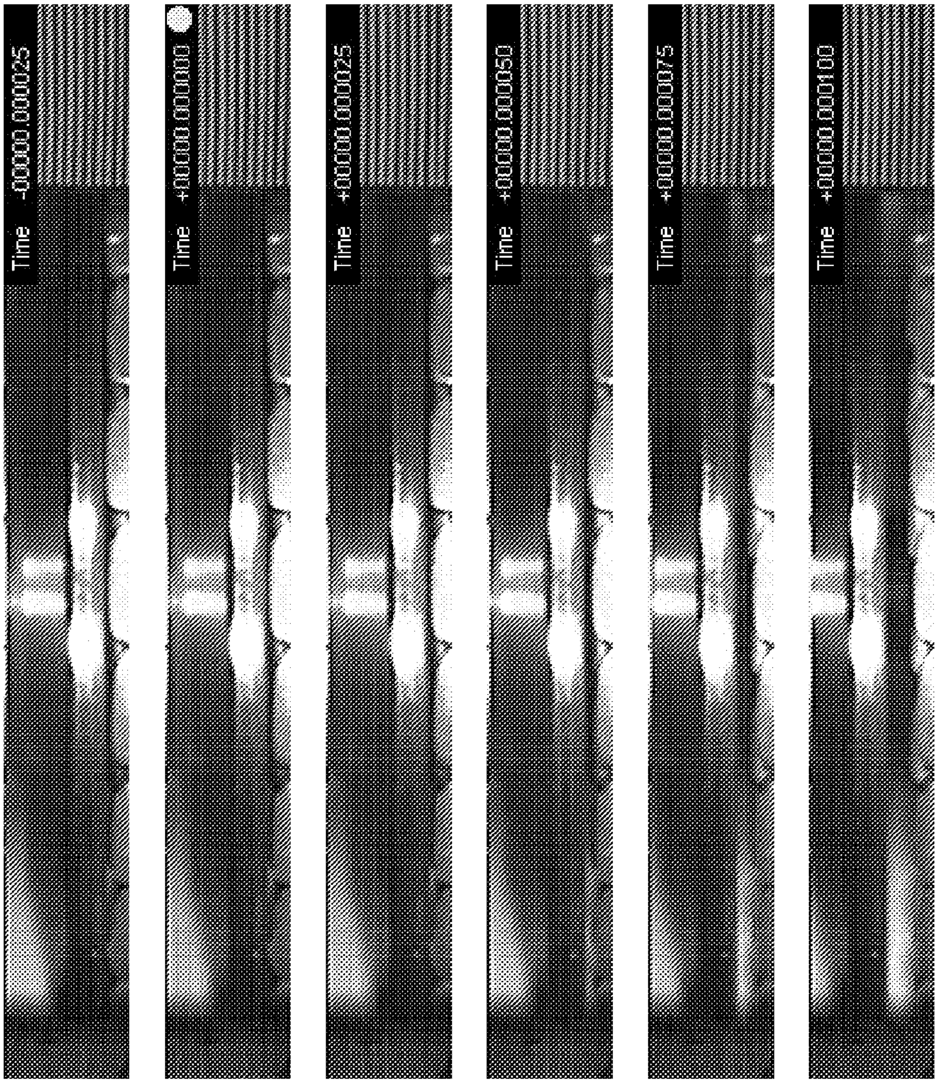
FIG. 10 shows a series of time-lapsed photographs showing the disk of the mechanical contactor moving away from the contacts.

FIG. 10 shows a series of time-lapsed photographs showing the movement of disk 408 away from the contacts as a function of time. (Note that, in FIG. 10, only outer contacts 402 can be seen.) As can be seen, disk 408 is completely separated from the contacts at the 100 microsecond mark. Therefore, once a fault has been detected by the detection circuitry, the current can be interrupted by the power electronics 202 within 100 microseconds.

Figure 11:
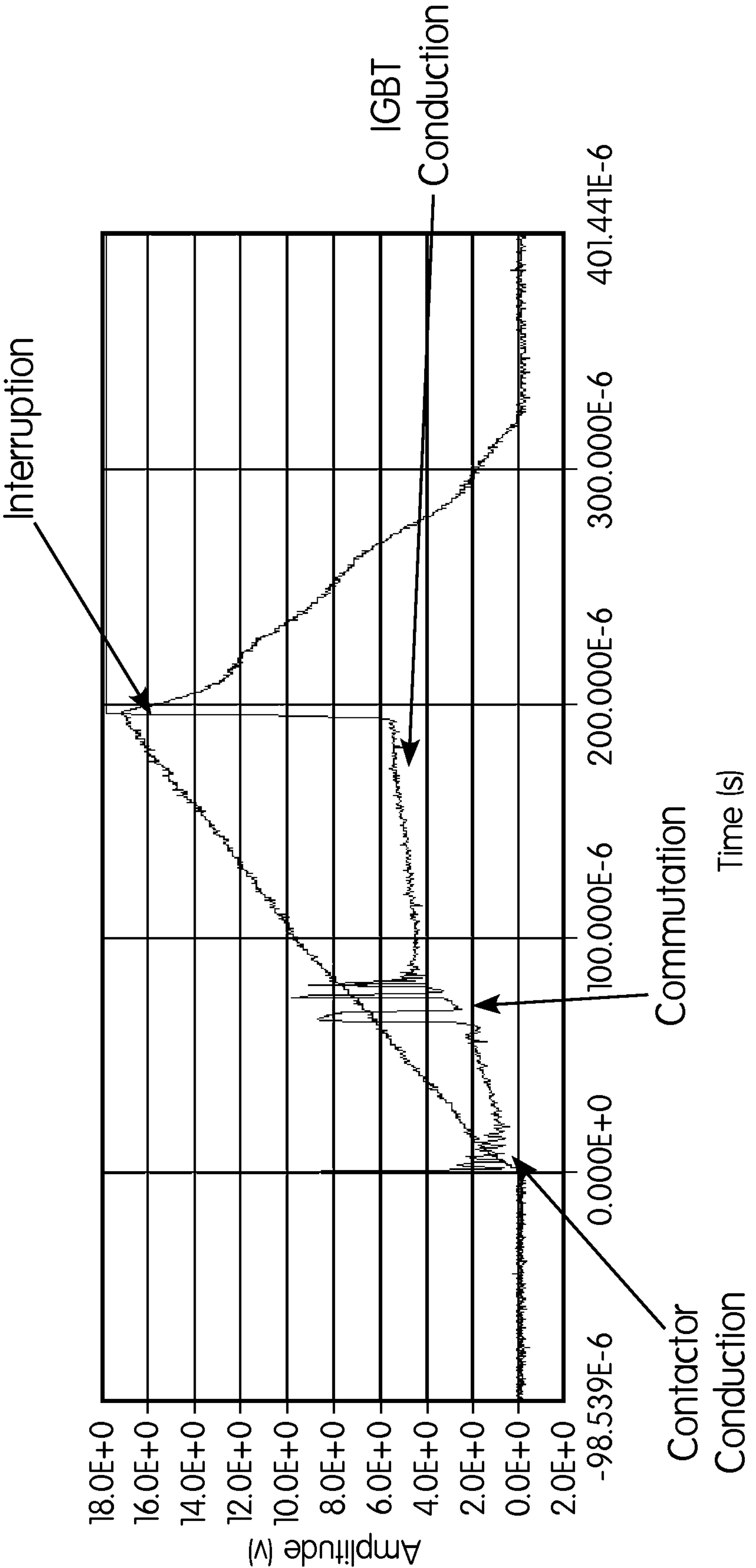
FIG. 11 is a graph of voltage and current versus time, showing the various stages of the fault interruption process.

FIG. 11 is a graph showing both voltage and current over time throughout the entire fault interruption process. (Note that the scale for the current in this graph is 100 times the scale for the voltage shown on the left side of the graph). The fault in FIG. 11 starts at time zero and mechanical contactor 102 is conducting the current. At around the 50 microsecond mark, commutation starts. Within that 50 microseconds, the fault was detected and the Thompson drive coil was energized to launch disk 408 away from contacts 402 and 404 of mechanical contactor 102. By about the 80 microsecond mark, the current is completely commutated and is being conducted by power electronics 202. The entire commutation process takes approximately 30 microseconds. The voltage during that time never exceeds about 10 volts, which is not large enough to cause arcing in the gap between stationary contacts 402 and 404 and moveable disk 408. It is estimated that at least 15 v would be needed for arcing to occur. Note that the normal voltage drop between the supply side and the load side through mechanical contactor 102 is about 2 v. As a result, there is no arcing during the commutation process.

During the period between about 80 microseconds and 195 microseconds, power electronics 202 are conducting the fault current. At a little after the 195 microsecond mark, the power electronics are switched off and the current is interrupted. Thus, the entire process from start of the fault to interruption of the current has taken less than 200 microseconds.

Figure 12:
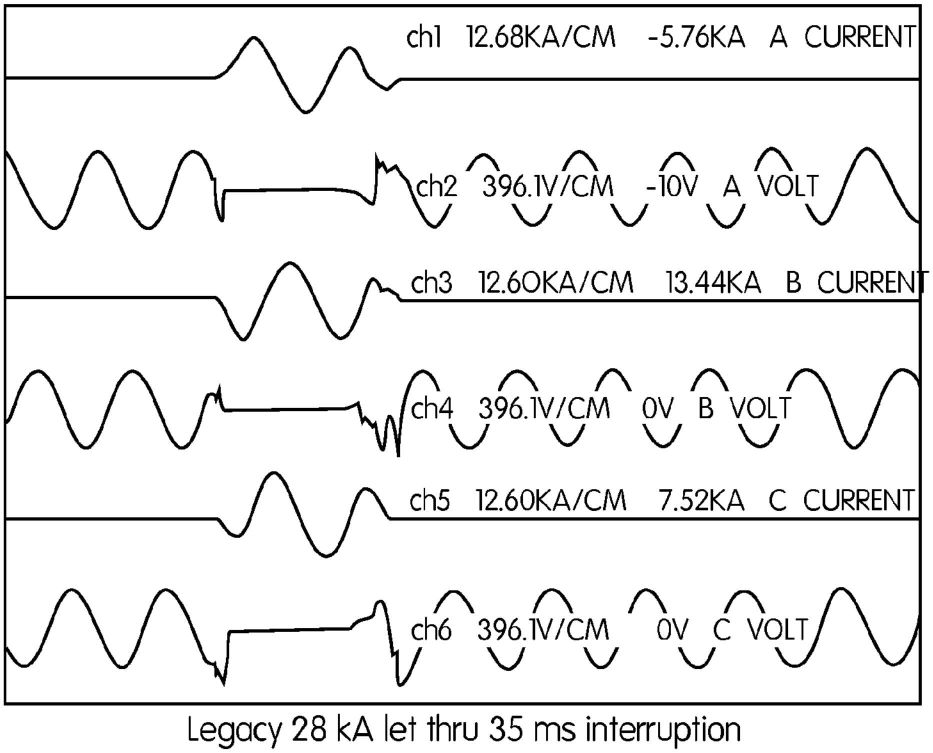
FIG. 12 is a graph showing the voltage and current during a fault for both legacy systems and for the device of the present invention.
Figure 12:
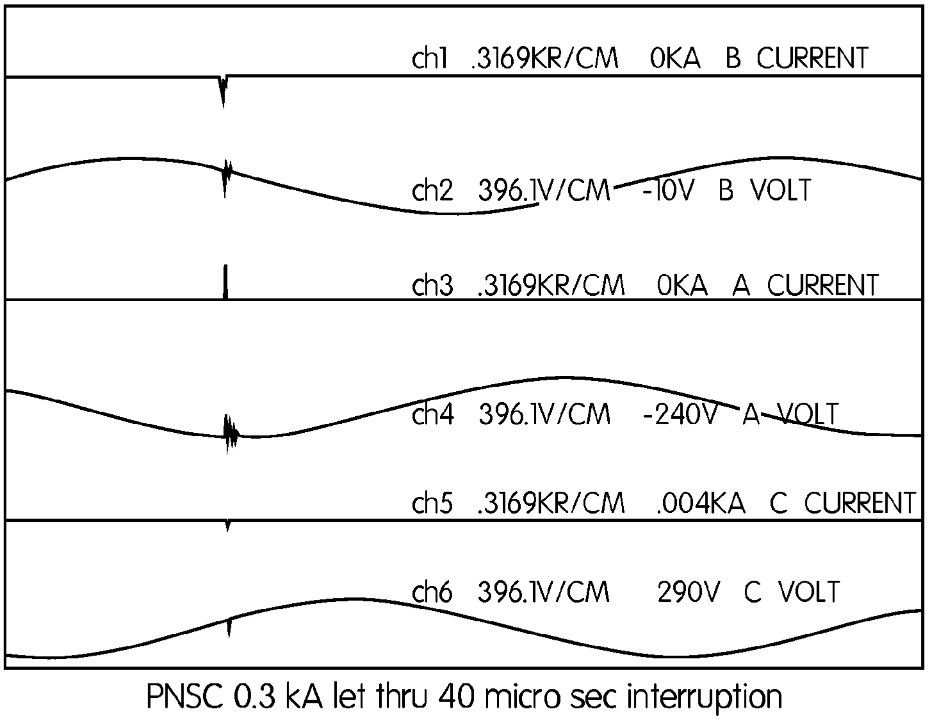

FIG. 12 shows a graph of both current and voltage for three phases of a system for both legacy prior art systems and for the power node switching center of the present invention when closing on a faulted circuit. As can be seen in the legacy system, for a 20 kA rms available fault current, the interruption process takes about 2 cycles or about 35 milliseconds. During this time period, the voltage has dropped to zero and the upstream system has been subjected to a 28 kA fault current. Using the present invention, the fault current is limited to about 0.3 kA and the interruption of the voltage to other loads has been limited to about 40 microseconds. This represents an approximate thousand fold improvement over the prior art systems.

Figure 13:
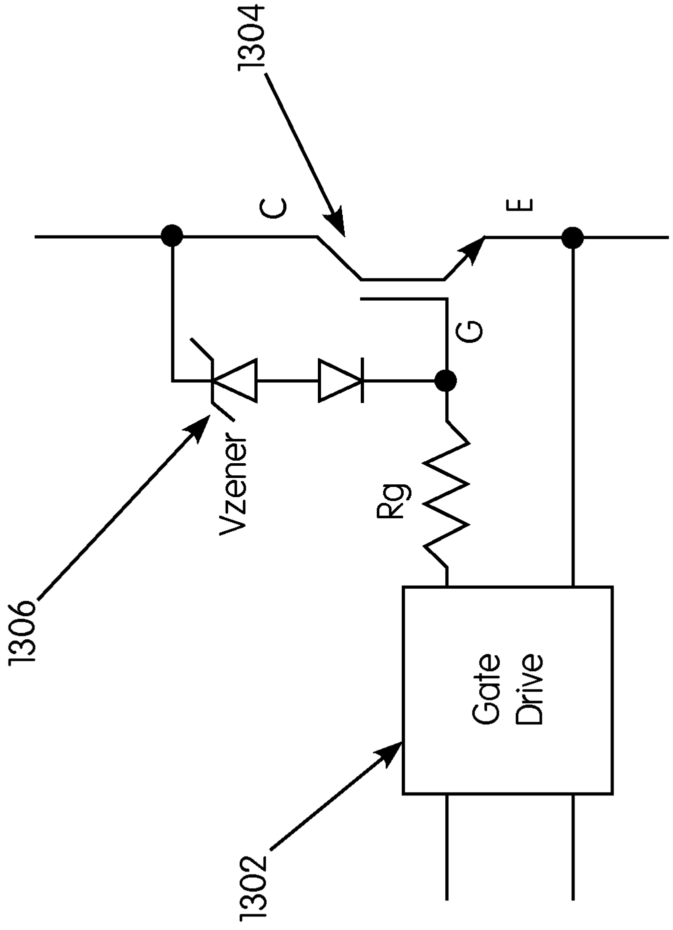
FIG. 13 is a circuit diagram of the active feedback control for the power electronics.

In another aspect of the invention an active feedback control is provided to control the opening and closing of the IGBT during a shutdown procedure. The basic circuit diagram is shown in FIG. 13. This circuit configuration addresses the shortcomings of both passive and active snubbing while completely eliminating parallel snubbing components. The interrupting switch is used to control the voltage and absorb the energy. This is accomplished by turning off the switch under active feedback control to limit the voltage developed during turnoff. The switch then absorbs the circuit energy eliminating the need for any additional energy absorbing components. The feedback control is accomplished with minimal, low cost components without adding significant size, weight, and cost to the system.

The interruption should be conducted at the constant, maximum voltage which is safe and which will minimize interruption time and energy dissipation. An ideal interrupter would have a low on-state voltage drop, then when commanded to turn off, it would develop a preset, maximum safe voltage, and maintain that voltage until the current is forced to zero and all the energy from the circuit is absorbed in the switch. Of necessity, the maximum safe voltage must be higher than the source voltage to drive current through the IGBT.

Figure 14:
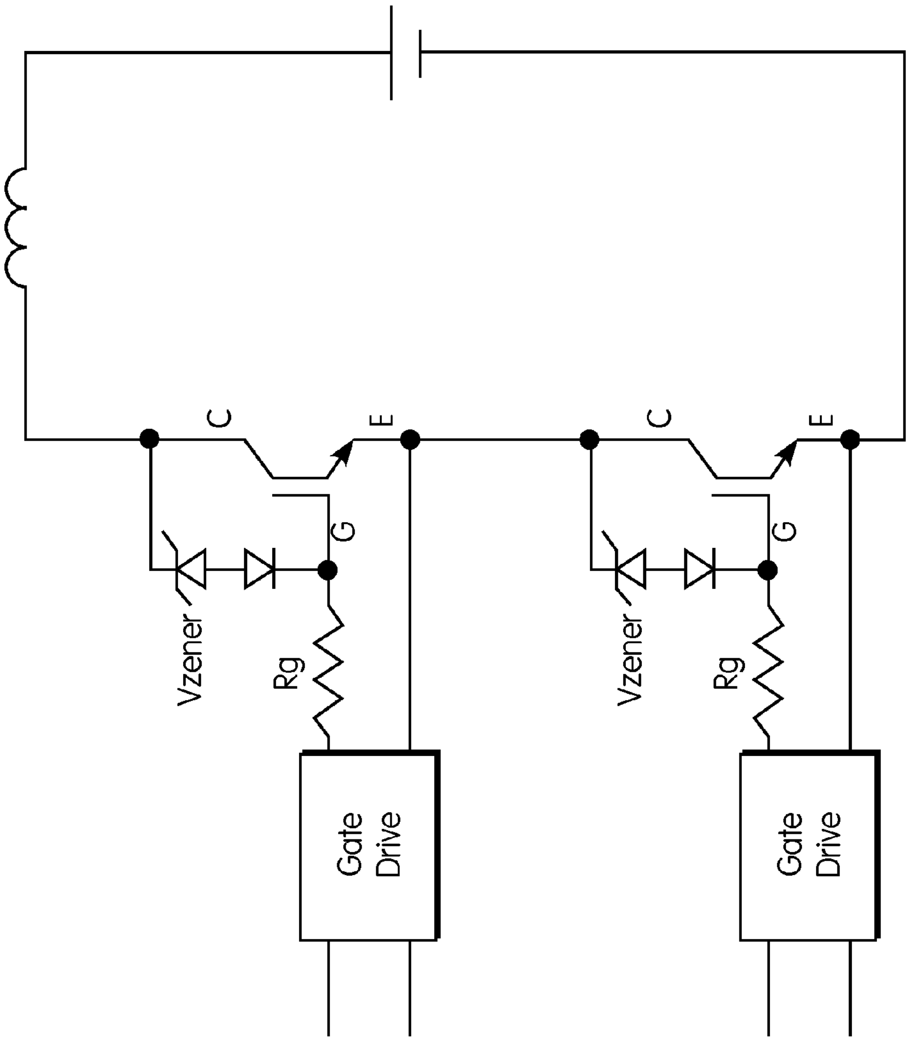
FIG. 14 is a circuit diagram showing multiple IGBTs in series using the active feedback control feature.

A linear solid state device, such as a transistor (IGBT, FET, BJT, etc.) 1304, can be used to achieve near ideal interrupter performance. Gate drive 1302 determines when the switch should be turned on or off, responsive to the input signals which would typically indicate a fault in the circuit. Feedback from the power terminals (e.g. drain to source voltage on a FET) is provided to the gate such that, when gated off, the device linearly regulates to a predetermined set voltage. As shown in FIG. 13, this can be accomplished by connecting zener diode 1306 with a limit voltage equal to the desired preset voltage level between the collector and gate of IGBT 1304. The set voltage must be below the safe voltage for the device and above the source voltage. When gated off the device will then develop a constant voltage due to the circuit inductance that is greater than the source voltage, which will drive the circuit current to zero. FIG. 14 also illustrates that devices can be connected in series to achieve higher interruption voltage capability. Devices can also be connected in parallel to achieve higher current interruption and energy absorption capability (not shown).

The basic operation of the circuit is as follows. The gate of switch 1304 is tied to the high voltage side of the switch via zener diode 1304. As long as the voltage across switch 1304 is below the turn-on voltage of zener diode 1306, the gate of switch 1304 is pulled down by gate drive circuit 1302 and switch 1304 is off. Initially, during a fault condition, switch 1304 is commended on to conduct the current which previously flowed through the normal current path, in the case of the PNSC, the previously-described mechanical contactor. When switch 1304 is thereafter commanded off, the voltage across it will rise due to the inductive energy stored in the circuit components, and, when the voltage exceeds the threshold voltage of zener diode 1306, zener diode 1306 is turned on and the gate voltage is thereby raised to turn on switch 1304 just enough to keep the voltage across switch 1304 at the threshold voltage of zener diode 1306.

Figure 15:
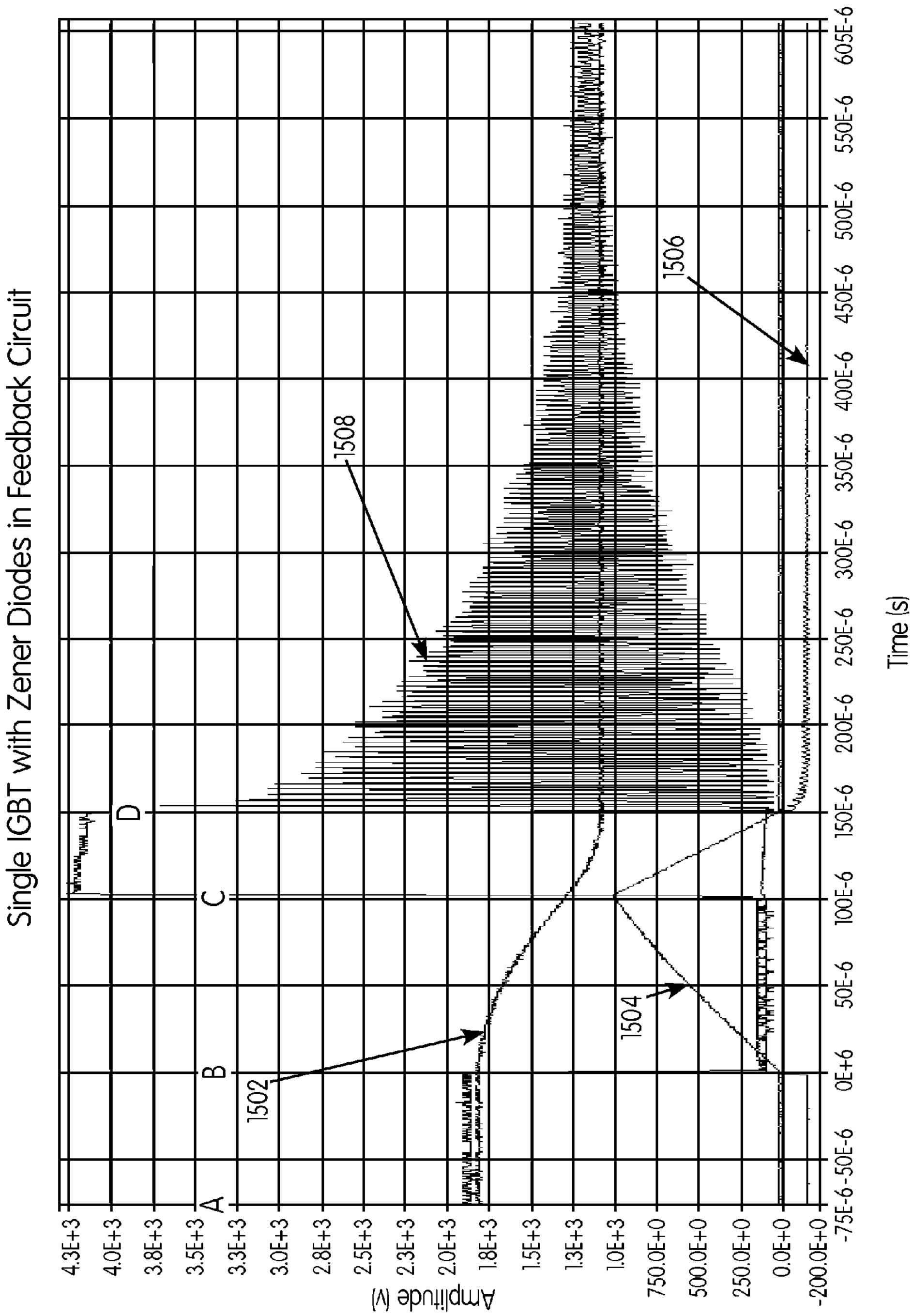
FIG. 15 is a graph showing various voltages in an circuit using the active feedback control during a shutdown procedure.

FIG. 15 shows the parameters of the circuit in operation. For purposes of example, this circuit has a single IGBT with 10 zener diodes in series, each having a turn-on voltage of 400 v, raising the maximum voltage drop across the IGBT to 4000 v. The IGBT must be properly sized to handle the maximum potential voltage drop. Additionally, this graph shows the operation of the circuit under test conditions, not as in-use in an actual PNSC, that is, the IGBT is not in parallel with a mechanical contactor for purposes of this graph.

The graph in FIG. 15 begins as the IGBT is initially turned off at time A. Line 1502 is the source voltage and starts at 1800V. Line 1508 is the voltage across the IGBT, and, as the device is not in parallel with a mechanical contactor, is initially at the source voltage (under actual use, in parallel with a mechanical contactor, this voltage would be near zero). At time B, the fault is simulated, the switch is turned on and the voltage across it collapses to a very low value. Line 1504 is the current, which is initially zero when the switch is turned off. At time B, when the switch is turned on, the current begins to rise and reaches 1000 A, when the IGBT is turned off at time C. The 100 millisecond delay between time B and time C is the approximate time that it takes for a mechanical contractor as described herein to open and stop conducting current. This, the raising current between times B and C represent current that would normally be conducted by the mechanical contactor prior to its opening.

At time C the IGBT is commended off by the gate drive and the gate voltage dips slightly, causing the voltage across the IGBT to rise to about 4200V, representing the source voltage and the voltage across the inductance in the circuit. This voltage remains nearly constant until the current is driven to zero. This shows the voltage regulation action of the zener diodes. The IGBT absorbs all the energy in the circuit during the time the current falls to zero at time D. Once the current is driven to zero, the voltage across the IGBT can no longer be maintained and begins to fall. Once the voltage falls below the threshold voltage of the zener diode, the gate voltage is drawn down to −15V by the gate drive and the IGBT is turned off. The voltage drop across the IGBT settles at the same voltage as the voltage source.

Line 1506 is the gate voltage (multiplied by 100 to make it visible on the plot). At time A, when the IGBT is turned off, the gate voltage is at −15V, holding the IGBT off. At time B, the gate voltage is commanded by the gate drive to +15V, to turn the IGBT on. At time C, the gate drive commands the gate voltage back to −15V to turn the IGBT off. As the gate voltage falls at time C, the voltage across the IGBT immediately jumps high and the zener diode turns on and maintains the gate voltage at about 12V, thus keeping the IGBT on. The gate voltage then falls slightly as the zener diode maintains just enough voltage on the gate to maintain the voltage across the IGBT above 4000V, until time D.

This graph shows that the zener feedback loop can regulate the voltage across the IGBT as it turns off. The voltage at which it regulates is almost exactly equal to the zener threshold voltage, so by adjusting the number and value of the zener diodes the voltage which the IGBT will develop can be easily selected. The IGBT must absorb the inductive energy in the circuit, as is apparent from the graph, which shows the voltage across the IGBT at 4000V while it is carrying the (falling) current.

Figure 16:
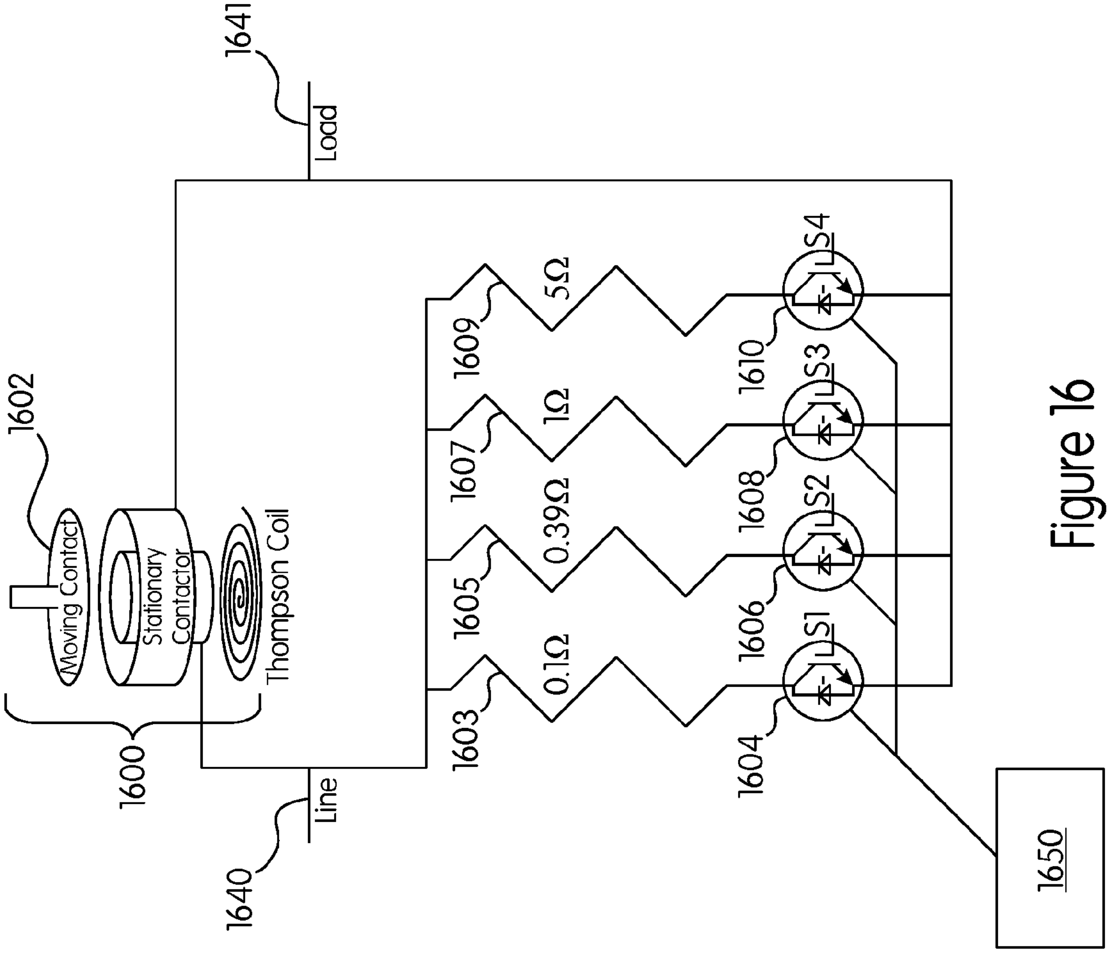
FIG. 16 is a circuit diagram showing an embodiment of the invention using the grounded resistance feature.

In another embodiment of the invention the solid state current path is implemented utilizing a network of parallel, staged resistors to provide a timed, graded resistance to dissipate the current in the circuit. This embodiment is shown in FIG. 16. The network shown in FIG. 16 is a four stage network wherein stage 1 consists of resistor 1603 and switch 1604; stage two consists of resistor 1605 and switch 1606; stage three consists of resistor 1607 and 1608; and stage four consists of resistor 1609 and switch 1610.

The switches in this case are electronically controllable. The switches are preferably IGBTs or Bipolar MOS transistors sized to carry the proper current, but any type of solid state switch may be used. The resistor value in each stage increases and the criteria for choosing the resistor values will be discussed below. A four stage resistor network is shown as an exemplary implementations of this embodiment of the invention, however the invention is meant to include all implementations having two or more resistor stages.

Contactor 1600 is the same mechanical contactor as in the previous embodiments of the invention consisting of a moving contact, a stationary contact and a Thompson coil to separate the contacts in the event of a fault. Contactor 1600 comprises one circuit path which will carry current during normal operation of the circuit and the solid state resistor network comprises a second, parallel circuit path which is utilized during a fault condition.

In normal operation, contactor 1600 is closed and conducting current with the moving contact and stationary contact in contact with each other. In addition, switches 1604, 1606, 1608 and 1610 are closed and can conduct current, although the resistors 1603, 1605, 1607 and 1609 respectively keep most of the current flowing through the contactor. Thus, the current through the resistor network under normal operating conditions is negligible.

When a fault occurs, the Thompson coil is energized, forcing the moving contact to move away from the stationary contact. As it does, current is commutated to the solid state path and begins to flow through all four legs of the resistor network. Initially, the resistor network presents a very low resistance to the flow of current. An external controller controls the opening and closing of switches 1604, 1606, 1608 and 1610. After the initial fault, all four switches stayed closed for a period of time and then open up in stepped, timed intervals, increasing the resistance of the resistor network in stages. Resistors 1603, 1605, 1607 and 1609 are preferably arranged from lowest resistance (1603) to highest resistance (1609). The switches are opened in order such that resistors of increasing resistance are sequentially removed from the resistor network, increasing the overall resistance of the network at each step. First, the smallest resistor the lowest resistor 1603 opens up at intervals of approximately 40 μS. Switches 1606, 1608 and 1610 open up each time a switch is opened up the resistance and resistor network is increased.

In the preferred illustrated implementation of this embodiment, the resistor stages all stay active for approximately 20 μS, then are removed from the resistor network one at a time at timed intervals of approximately 40 μS each.

Figure 17:
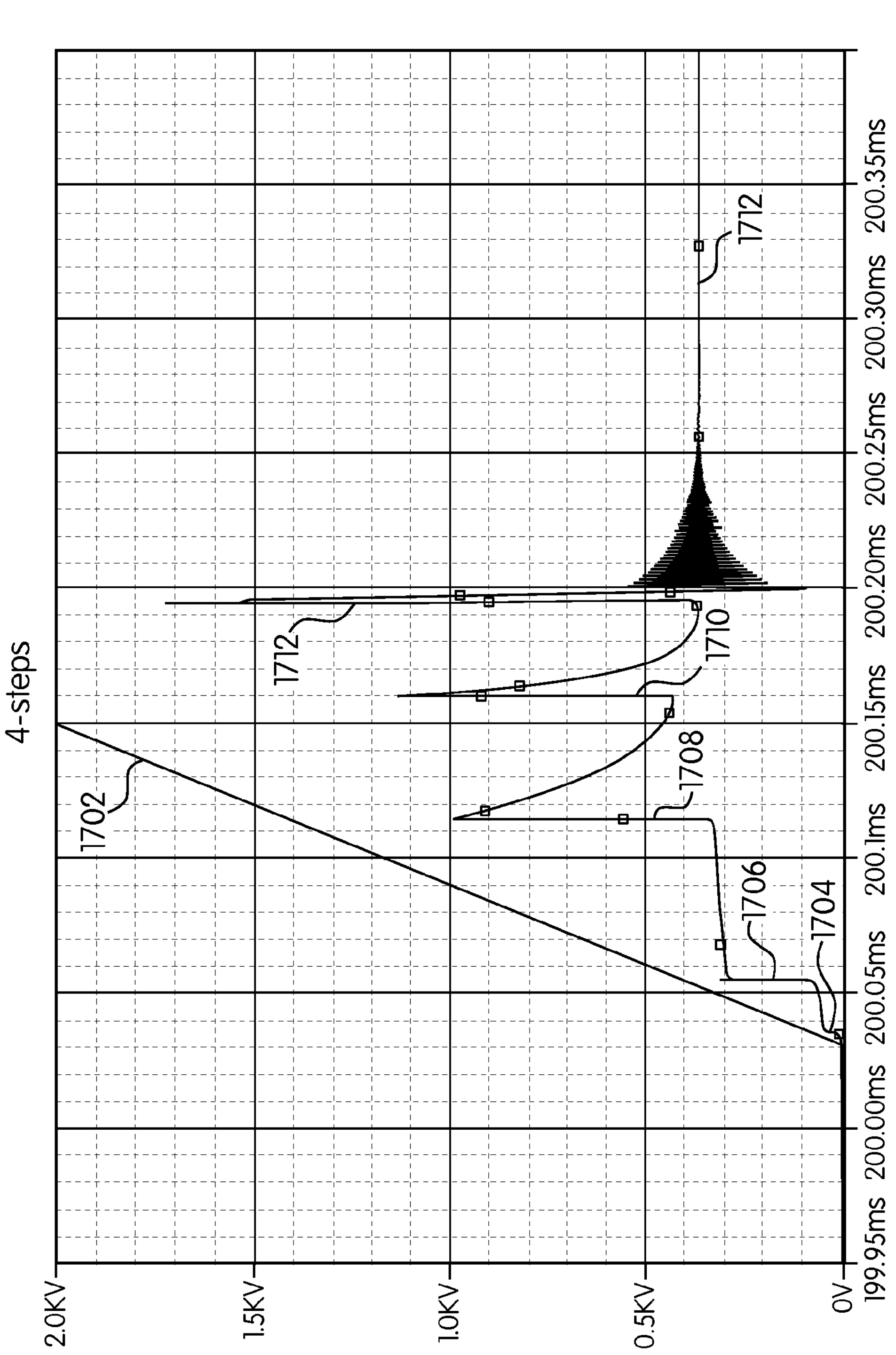
FIG. 17 is a graph showing voltage over time across the contactor and the solid state circuitry.

Referring now to FIG. 17, FIG. 17 is a graph of time versus voltage across both the contactor 1600 and the resistor network. As previously stated, in normal operation, the voltage across the contactor and the resistor network will be at or near zero volts, as the mechanical contactor presents no significant resistance to the flow of current. Most of the current will flow through the contactor as the path through the contactor is significantly less than the resistance through the resistor network, even with all four switches closed.

Line 1702 on FIG. 17 represents the voltage withstand of the contactor. This is the voltage which, if exceeded, will cause the contactor to arc as the contacts are moving apart. The slope of the voltage withstand line 1702 is dependent upon the speed at which the moving contact can move away from the stationary contact in contactor 1600. In the example shown in FIG. 17, the moving contactor is assumed to be able to move away from the stationary contact at a minimum rate of about ten m/s. Thus, immediately after a fault occurs, because of the high current flowing through the mechanical contactor, very little voltage across the contactor is required to produce an arc. However, as the current decreases and the contactors move further away from each other, more and more voltage is required to make the contactor arc. As can be seen, at 200.03 milliseconds very little voltage is required to make the contactor arc but by time 200.15 milliseconds, it will take over 2,000 volts to form an arc across the mechanical contactor.

Still with reference to FIG. 17, it can be seen that a fault occurs at time 200.03 milliseconds. Shortly thereafter, at time 1704 a voltage jump occurs. This voltage jump is caused by the opening of mechanical contactor 1600. At time 1706 (approximately 200.05+ ms, or about 20 μS after the fault has occurred) another voltage jump occurs. This is cause by the opening of switch 1604, which removes resistor 1603 from the resistor network, raising the overall resistance of the network. Between points 1704 and 1706 and 1706 and 1708, the voltage continues to rise because during this time period, the current is still increasing. At time 1708, switch 1606 is opened, thereby removing resistor 1605 from the resistor network. Again the overall resistance of the resistor network increases and the voltage spikes up to approximately one kV. At this point, the current is beginning to decrease and as such the voltage decreases after the second switch is opened, between times 1708 and 1710. At time 1710, switch 1608 is opened thereby removing the resistor 1607 from the network, leaving only resistor 1609. Again the voltage spikes because of the rise in resistance and thereafter decays as the current continues to decrease. At time 1712, switch 1610 opens and resistor 1609 is removed from the circuit, thereby eliminating current flow through the solid state path of the circuit. As mechanical contactor 1600 is also opened, no current can flow through the contactor path of the circuit either. As such, the voltage drops down to a level shown as 1714 on FIG. 17, which is residual line voltage, that is, the voltage being generated by a generator attached to the line input 1640 of the circuit. The oscillation which occur after the final resistor is removed are cause by parasitic inductance and capacitance inherent in the circuit.

The timing of the opening of switches 1604, 1606, 1608 and 1610 is controlled by controller 1650 shown in FIG. 16. In the example of this embodiment just discussed, the opening of each switch is preferably delayed by a time interval of approximately 40 μS. However, in other embodiments, for example embodiments having more or less resistor stages in the resistor network, the timing may need to be adjusted, for example, increasing for less resistors or decreasing for a greater number of resistors. Also, there is no requirement that the resistors open at regular intervals. The timing of the opening of the resistor stages may be sequenced pursuant to the specific design of the circuit, based on criteria and restrictions discussed herein.

In a preferred embodiment invention, controller 1650 is a programmable analog circuit, a field programmable gate array (FPGA) or an application specific integrated circuit (ASIC), which has been programmed with the appropriate timing profile. However, any well known means of controlling the timing of the opening of the respective switches for each resistor stage is acceptable.

The selection of the actual values of the resistors is based on several criteria. First, the initial resistance of the overall network (i.e., with all resistors in the network must be small enough such that the initial voltage spike remains below the voltage withdraw 1702 of the contactor). Therefore, in the examples shown in FIG. 17, the resistance network must supply a low enough resistance to keep the voltage, at time 1704, at a maximum of approximately 50 V and preferably less than 50 V. The second criteria is that when only one resistor, in this case resistor 1610, remains in the circuit, the resistance must be large enough to be able to bring the current down such as to reduce the size of the voltage spike at the end to keep it under the voltage withdraw 1702 of contactor 1600.

The resistors in between the first and last resistor are there to smooth off the curve between the initial voltage spike and the final voltage spike and should be chosen accordingly. Preferably, the resistors will increase in value with each subsequent stage, and will be removed from the circuit in order from lowest to highest, such as the overall resistance of the parallel resistors will increase with the removal or each stage.

In the example, shown, the resistors used are 0.1Ω (Stage 1), 0.39Ω (Stage 2), 1Ω (Stage 3) and 5Ω (Stage 4). Thus, the overall resistance of the parallel resistor network will increase as each stage is removed forth network as follows: 0.03Ω (after 1704)→0.31Ω (after 1706)→0.83Ω (after 1708)→5Ω (after 1710)→open circuit (after 1712).

The slope of the voltage withdraw line 1702 will change depending upon the speed at which moving contact 1602 can move away from stationary contact 1601 of the contactor 1600. This is dependent on mechanical characteristics of contactor 1600, for example, the weight of the plates and the size of the Thompson coil.

The actual design of the circuit may vary depending on multiple factors, however, all variations are intended to be within the scope of this invention. For example, the actual values of the components to the circuit may change depending upon the mechanical characteristics of the contactor 1600, the size of the generator supplying voltage to the circuit and the number of stages in the resistor network. Those that are skilled in the art will see that, for example, the values of the resistors at the resistor network may change depending upon these criteria as well as the timing of the controller in removing resistors from the network.

While the general concepts of the power node switching center have been outlined herein, the specific implementation details for each embodiment are meant to be exemplary only and not part of the invention. It should be readily realizable to one of ordinary skill in the art that many different implementations are possible and still remain within in the spirit of the invention. This entire scope of the invention is defined by the claims which follow.

We claim:

1. A circuit interrupting device having a graded resistance current path comprising:

a. a first current path, traversing a mechanical contactor;

b. a second current path, parallel to said first current path, said second current path comprising a resistance network of two or more switched, parallel resistance stages; and c. fault detection circuitry, for detecting a fault condition and producing a fault signal;

wherein a fault current is commutated from said first current path to said second current path upon detection of said fault current by opening said mechanical contactor; and further wherein each stage of said resistance network is sequentially switched out of said network, until an open circuit condition exists, thereby changing the overall resistance of said resistance network as each stage is switched.

2. The circuit interrupting device of claim 1 wherein each of said resistance stages in said resistance network comprises a resistance and a switch and wherein said switch is closed in the absence of said fault signal.

3. The circuit interrupting device of claim 2 wherein said switch is electronically controllable.

4. The circuit interrupting device of claim 3 further comprising a controller, responsive to said fault signal, for controlling said switches in each of said resistance stages in said resistance network.

5. The circuit interrupting device of claim 4 wherein said controller opens each switch in said resistance stages in said resistance network at timed intervals after receiving said fault signal, thereby sequentially removing each resistance stage from said resistance network.

6. The circuit interrupting device of claim 1 wherein the overall resistance of said resistance network is controlled such that the voltage drop across said resistance network the does not exceed the voltage withstand of said mechanical contactor at any time between the detection of said fault condition and the time at which all stages have been removed from said resistance network.

7. The circuit interrupting device of claim 6 wherein said resistance value in each of said resistance stages is higher than in the previous stage and further wherein said resistance stages are remove in order from lowest to highest, such that the overall resistance of said resistance network increases as each stage is remove from said resistance network.

8. The circuit interrupting device of claim 6 where said mechanical contactor comprises:

a. a stationary contact;

b. a moveable contact; and c. a Thompson coil that, when energized, forces said movable contact away from said stationary contact.

9. The circuit interrupting device of claim 8 wherein the voltage withstand voltage of said mechanical contactor increases as said moveable contact moves away from said stationary contact.

10. The circuit interrupting device of claim 4 wherein said controller is selected from a group consisting of a programmable analog circuit, a field programmable gate array and an application specific integrated circuit.

11. The circuit interrupting device of claim 1 wherein said fault detection circuitry comprises:

a current detector;

a high gain, narrow bandwidth integrator, coupled to the output of said current detector; and a first level detection circuit, coupled to the output of said narrow bandwidth integrator, for producing a fault signal when a fault condition is detected.

12. The circuit interrupting device of claim 11 wherein said fault signal is produced when the response of said narrow bandwidth integrator exceeds a predetermined level.

13. The circuit interrupting device of claim 12 wherein said narrow bandwidth integrator produces a response to line frequency current that is below said predetermined level.

14. The circuit interrupting device of claim 11 further comprising:

a low gain, wide bandwidth integrator for sensing line frequency current; and a second level detection circuit, coupled to the output of said wide bandwidth integrator, for sensing line frequency current and for producing a fault signal when a fault condition is detected.

15. The circuit interrupting device of claim 14 wherein said fault signal is produced when the response of said wide bandwidth integrator exceeds a predetermined level.

16. The circuit interrupting device of claim 11 wherein said current detector is a Rogowski Coil.

17. The circuit interrupting device of claim 2 wherein said switches are IGBTs.

18. A method for handling an electrical fault comprising the steps of:

a. detecting said fault using a fault detection circuitry, said fault detection circuitry producing a fault signal;

b. opening a mechanical contactor having a stationary contact and a moving contact by forcing said moving contact away from said stationary contact in response to said fault signal;

c. providing a secondary, parallel path to handle current flow as said mechanical contactor is opened, said secondary path being a resistance network having a plurality of parallel, switched resistance stages; and d. sequentially opening said switch in each of said resistance stages at staged intervals, thereby increasing the overall resistance of said resistance network at each interval, until said secondary path is an open circuit.

19. The method of claim 18 wherein the voltage drop across said resistance network is never allowed to exceed a voltage which would cause arcing across said mechanical contactor.

20. The method of claim 18 wherein said switches in each stage of said resistance network are controlled by a programmed controller responsive to said fault signal.

21. A circuit interrupting device having a graded resistance current path comprising:

a. a first current path, traversing a mechanical contactor;

b. a second current path, parallel to said first current path, said second current path comprising a resistance network of two or more switched, parallel resistance stages;

c. fault detection circuitry, for detecting a fault condition; and d. a controller programmed, upon detection of said of said fault condition, to sequentially switch each stage of said resistance network out of said network, until an open circuit condition exists, thereby changing the overall resistance of said resistance network as each stage is switched;

e. wherein said mechanical contactor is opened upon detection of said fault condition, thereby commutating current in the circuit from said first current path to said second current path.

* * * * *